(12) United States Patent
Ito

(10) Patent No.: US 10,203,206 B2
(45) Date of Patent: Feb. 12, 2019

(54) IMAGE CAPTURE APPARATUS HAVING SIGNAL READOUTS USING DISTANCE MEASUREMENT REGION

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 15/492,613

(22) Filed: Apr. 20, 2017

(65) Prior Publication Data

US 2017/0307371 A1 Oct. 26, 2017

(30) Foreign Application Priority Data

Apr. 22, 2016 (JP) .................................. 2016-086549

(51) Int. Cl.
*H04N 5/445* (2011.01)
*G01C 3/08* (2006.01)
*H04N 5/369* (2011.01)
*H04N 5/378* (2011.01)
*H04N 5/3745* (2011.01)

(52) U.S. Cl.
CPC ............ *G01C 3/08* (2013.01); *H04N 5/3696* (2013.01); *H04N 5/378* (2013.01); *H04N 5/37457* (2013.01); *H04N 5/44504* (2013.01)

(58) Field of Classification Search
CPC .... G01C 3/08; H04N 5/37457; H04N 5/3696; H04N 5/378; H04N 5/44504
See application file for complete search history.

(56) References Cited

U.S. PATENT DOCUMENTS

| | | | |
|---|---|---|---|
| 6,366,699 B1* | 4/2002 | Kuwano | G06K 9/325 345/467 |
| 8,749,697 B2* | 6/2014 | Sakaida | H04N 5/23212 348/350 |
| 2014/0313320 A1* | 10/2014 | Kikuchi | G06K 9/3233 348/133 |
| 2015/0146033 A1* | 5/2015 | Yasugi | H04N 5/353 348/222.1 |

FOREIGN PATENT DOCUMENTS

JP 2013-068759 A 4/2013

\* cited by examiner

*Primary Examiner* — Padma Haliyur
(74) *Attorney, Agent, or Firm* — Canon U.S.A., Inc. IP Division

(57) ABSTRACT

An image capture apparatus includes an imaging element, first and second setting units, and a reading unit. The imaging element includes a plurality of pixels configured to have a plurality of photoelectric conversion units for one micro lens. The first setting unit sets a first region and a second region. The second setting unit sets a distance measurement region. The reading unit performs different readout operations in the first region and the second region. At the time of capturing images in a plurality of frames, when the second setting unit sets the same distance measurement region in the images in the plurality of frames, the first setting unit changes the position of the first region in the distance measurement region between the images in the plurality of frames at random or periodically.

18 Claims, 15 Drawing Sheets

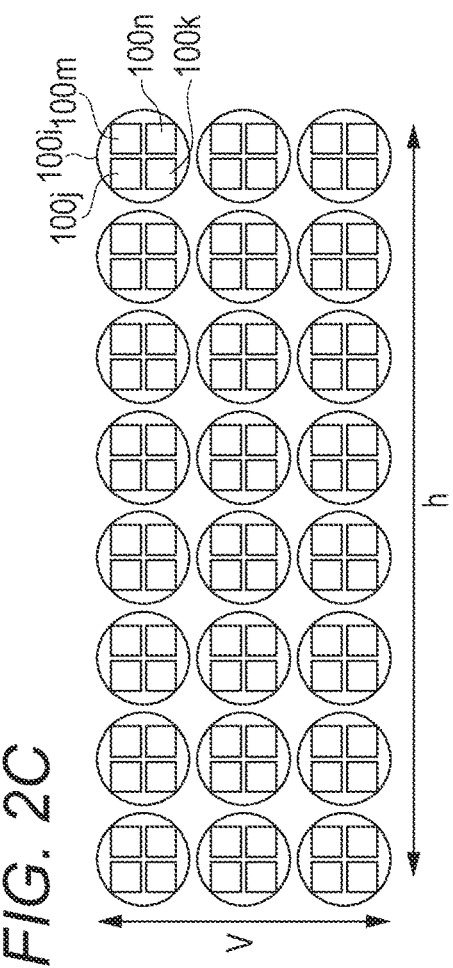
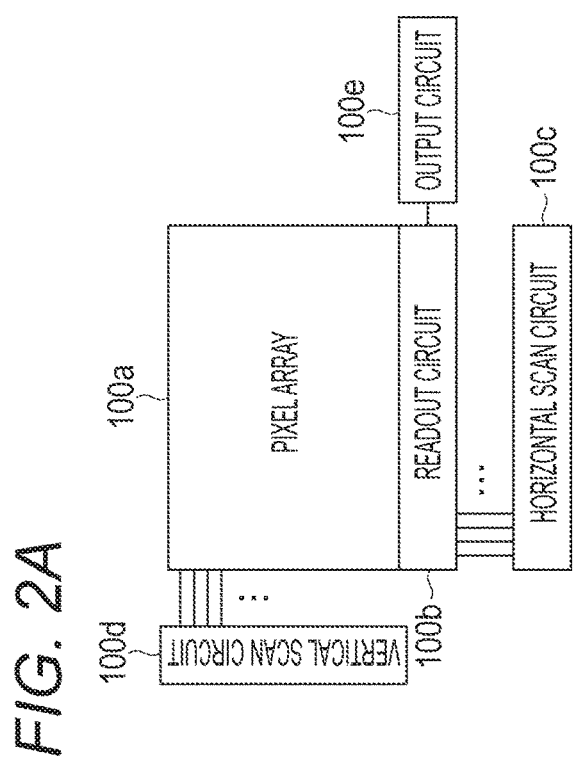
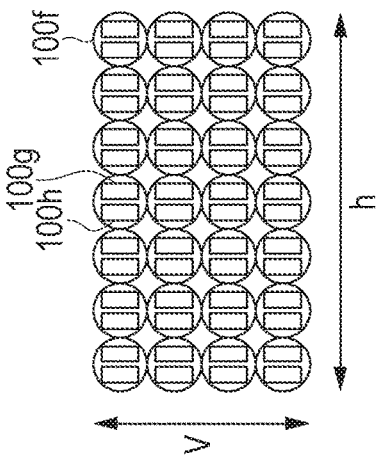

IMAGE CAPTURE APPARATUS HAVING SIGNAL READOUTS USING DISTANCE MEASUREMENT REGION

BACKGROUND OF THE INVENTION

Field of the Invention

One disclosed aspect of the embodiments relates to a technique for driving an imaging element including a plurality of pixels with a plurality of photoelectric conversion units.

Description of the Related Art

It is known an imaging element structured in such a manner that a plurality of micro lenses are arranged two-dimensionally and a plurality of photoelectric conversion units (such as photodiodes) are disposed for one micro lens. Japanese Patent Laid-Open No. 2013-068759 discloses a configuration in which, when distance measurement is performed by using such an imaging element, image signals with parallax are read from only some of pixels corresponding to a distance measurement region to reduce the amount of calculation necessary for processing the read image signals.

According to the configuration described in Japanese Patent Laid-Open No. 2013-068759 mentioned above, it is possible to shorten the time required to read image signals from the entire imaging element. However, when image signals are read by different methods between some of the pixels and the others, the difference in the reading method results in a difference in the level of noise signals superimposed on the output image signals between some of the pixels and the others.

When the position of the distance measurement region does not change in a plurality of frames of a moving image, image signals with parallax are read from the pixels in the same region in the plurality of frames. In this case, the difference in the level of the noise signals between the distance measurement region and the other regions may be more prominent.

SUMMARY OF THE INVENTION

An embodiment includes an imaging element, a first setting unit, a second setting unit, and a reading unit. The imaging element includes a plurality of pixels configured to have a plurality of photoelectric conversion units for one micro lens. The first setting unit sets ones of the plurality of pixels in the imaging element as a first region and sets other ones of the plurality of pixels as a second region. The second setting unit sets a distance measurement region for at least some of the plurality of pixels. The reading unit performs a first readout operation of reading, from a first pixel included in the first region and the distance measurement region of the imaging element, signals according to electric charges accumulated in the photoelectric conversion units of the first pixel, and performs a second readout operation of reading, from a second pixel included in the second region and the distance measurement region, signals according to electric charges accumulated in the photoelectric conversion units of the second pixel, the second readout operation being different from the first readout operation. The imaging element captures images in a plurality of frames, and when the second setting unit sets the same distance measurement region in the images in the plurality of frames, the first setting unit changes the position of the first region in the distance measurement region between the images in the plurality of frames at random or periodically.

Further features of the disclosure will become apparent from the following description of exemplary embodiments (with reference to the attached drawings).

BRIEF DESCRIPTION OF THE DRAWINGS

FIG. 2A is a diagram describing a configuration of an imaging element used in the image capture apparatus, and FIGS. 2B and 2C are diagrams describing configurations of pixel arrays.

DESCRIPTION OF THE EMBODIMENTS

Figure 1:
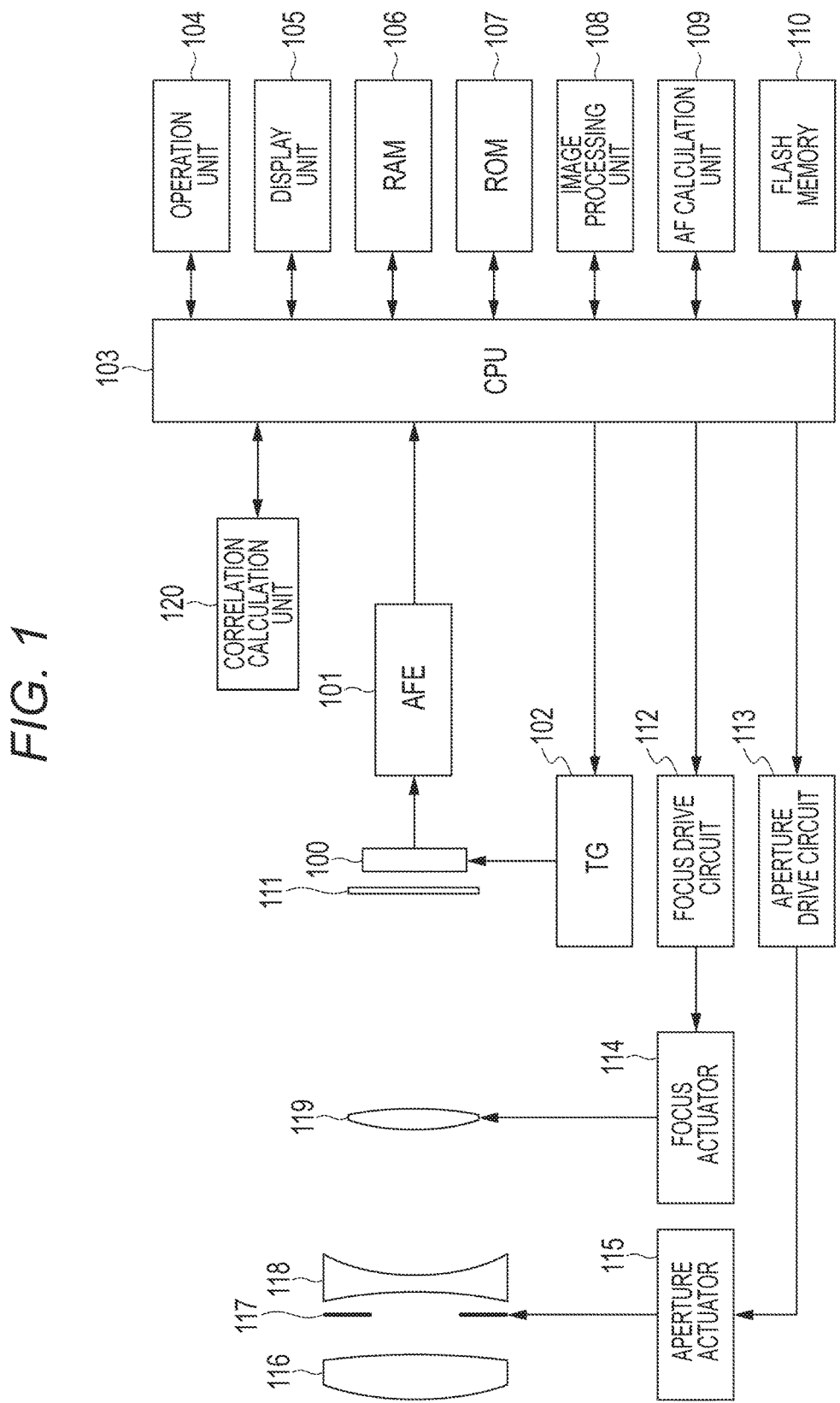
FIG. 1 is a block diagram describing a configuration of an image capture apparatus.

Preferable embodiments of the disclosure will be described below in detail with reference to the accompanying drawings. The following embodiments are mere examples for carrying out the disclosure, and the disclosure is not limited to the configurations illustrated in the drawings.

First Embodiment

A first embodiment will be described below with reference to the drawings.

FIG. 1 is a block diagram describing a configuration of an image capture apparatus according to the first embodiment. Referring to FIG. 1, an imaging element 100 converts photoelectrically an optical image of a subject formed in an imaging optical system into an electric signal. The imaging element 100 is controlled by a central processing unit (CPU) 103 described later or the like to capture still images or moving images. An analog front end (AFE) 101 subjects an analog image signal output from the imaging element 100 to digital conversion corresponding to gain adjustment and a predetermined quantization bit. A timing generator (TG) 102 controls timings for driving the imaging element 100 and the AFE 101. In the embodiment, the AFE 101 and the TG 102 are disposed outside the imaging element 100, but it is possible to involve them in the imaging element.

As described above, the CPU 103 executes programs for controlling the components of the imaging element. An operation unit 104 makes settings for an instruction for image capturing, imaging conditions, and others to the CPU 103. A display unit 105 displays captured still images and moving images, menus, and others. A RAM 106 has both the function of an image data storage unit to store image data subjected to digital conversion by the AFE 101 and image data processed by an image processing unit 108 described later and the function of a working memory where the CPU 103 performs operations. In the embodiment, these functions are performed by the use of the RAM 106, but they may be performed by another memory as far as the speed of access to the memory is fast enough for the memory operation. The ROM 107 stores programs loaded and executed by the CPU 103 to control the operations of the components and coefficient groups for use in a noise reduction circuit described later. In the embodiment, the ROM 107 is a flash memory as an example. However, the ROM 107 may be another memory as far as the speed of access to the memory is fast enough for the memory operation. The image processing unit 108 performs processes such as correction and compression of captured still images or moving images, and others. The image processing unit 108 also has the function of separating data into image data A and image data B described later, the function of correcting images described later, and the function of generating still images and moving images.

An AF calculation unit 109 uses the result of correlation calculation output from a correlation calculation unit 120 to determine the drive amount of a focus lens. A flash memory 110 is a detachable flash memory for recording still image data and moving image data. In the embodiment, the flash memory is applied as a recording medium. Alternatively, another data-writable non-volatile memory may be used or these recording media may be built in.

A focal plane shutter 111 adjusts exposure time in still image capturing. In the embodiment, the focal plane shutter adjusts the exposure time of the imaging element 100. However, the disclosure is not limited to this but the imaging element 100 may have an electronic shutter function to adjust exposure time by a control pulse. A focus drive circuit 112 changes the focal position of the optical system in such a manner as to control driving of a focus actuator 114 based on the result of focus detection by the AF calculation unit 109 and drive a third lens 119 forward and backward in an optical axis direction to make focus adjustment. An aperture drive circuit 113 controls driving of an aperture actuator 115 to control the aperture diameter of a diaphragm 117. A first lens 116 is disposed at the front end of an imaging optical system (common optical system) and is held in such a manner as to be movable forward and backward in the optical axis direction. The diaphragm 117 adjusts the aperture diameter to adjust the light amount for image capturing. The diaphragm 117 and a second lens 118 move integrally forward and backward in the optical axis direction to implement a magnification operation (zoom function) in cooperation with the forward and backward movement of the first lens 116. The third lens 119 adjusts the focus of the imaging optical system by the forward and backward movement in the optical axis direction. The correlation calculation unit 120 performs correlation calculations by the use of pixel signals output from the imaging element 100.

Next, a configuration of the imaging element 100 will be described with reference to FIGS. 2A to 2C. FIG. 2A is a diagram describing a configuration of the imaging element 100. Referring to FIG. 2A, the imaging element has a pixel array 100*a* in which pixels are arrayed two-dimensionally, a vertical scan circuit 100*d* that selects a row of pixels from the pixel array 100*a*, and a horizontal scan circuit 100*c* that selects a column of pixels from the pixel array 100*a*. The imaging element 100 further includes a readout circuit 100*b* that reads signals from pixels selected by the vertical scan circuit 100*d* and the horizontal scan circuit 100*c* from the pixels of the pixel array 100*a*. The vertical scan circuit 100*d* selects a row from the pixel array 100*a* and activates in the selected row a readout pulse output from the TG 102 according to a horizontal synchronization signal output from the CPU 103. The readout circuit 100*b* has amplifiers and memories provided for the individual columns, and stores the pixel signals from the scanned row into the memories via the amplifiers. The pixel signals from one row stored in the memories are selected in sequence by the horizontal scan circuit 100*c* in a column direction, and output to the exterior via an output circuit 100*e*. This operation is repeated to output the signals from all the pixels to the exterior.

FIG. 2B is a diagram describing a pixel array 100*a* of the imaging element 100. Referring to FIG. 2B, micro lenses 100*f* constitute a micro lens array. Photodiodes (PD) 100*h* and 100*g* constitute image A photoelectric conversion units and image B photoelectric conversion units described later as photoelectric conversion units to perform photoelectric conversion. Each pixel is structured in such a manner that one micro lens 100*f* is arranged above two PDs. That is, each focus detection pixel includes a plurality of photoelectric conversion units for one micro lens. When it is assumed that an imaging region sharing the micro lenses 100*f* is regarded as one pixel, the pixel array 100*a* has h pixels arranged in a horizontal direction and v pixels arranged in a vertical direction. Signals accumulated in the PD 100*h* and the PD 100*g* are converted into voltage signals simultaneously or independently by a pixel transfer operation described later, and they are output to the exterior by the readout operation described above. The PD 100*h* and the PD 100*g* are configured in a pupil-divided manner, and different images with a phase difference are entered into them. Accordingly, it is possible to read the signals independently from the PD 100*h* and the PD 100*g*, perform a correlation calculation process on the signals by the correlation calculation unit 120, and calculate the drive amount of the focus lens by the AF calculation unit 109 with the use of the result of the process. In this example, the PD 100*h* is the image A photoelectric conversion unit and the PD 100*g* is the image B photoelectric conversion unit. FIG. 2B illustrates the configuration in which two PDs are arranged for one micro lens, but the disclosure is not limited to this. The disclosure is also applicable to a configuration in which a plurality of PDs is disposed both vertically and horizontally for one micro lens. Alternatively, the PDs can be pupil-divided into four or more. For example, FIG. 2C illustrates an example in which four PDs are disposed. Each pixel 100*i* is composed of pupil-divided PD 100*j*, PD 100*k*, PD 100*m*, and PD 100*n*. Images with different phases can be entered into the PD 100*j*, the PD 100*k*, the PD 100*m*, and the PD 100*n*, and signals can be separately read from these PDs. Alternatively, depending on the situations, the signals may be simultaneously read from the PD 100*j* and the PD 100*k* and the signals may be simultaneously read from the PD 100*m* and the PD 100n. Accordingly, it is possible to acquire the phase difference in the horizontal direction through the calculation by the correlation calculation unit 120. Alternatively, the signals may be simultaneously read from the PD 100j and the PD 100m, and the signals may be simultaneously read from the PD 100k and the PD 100n. Accordingly, it is possible to acquire the phase difference in the vertical direction through the calculation by the correlation calculation unit 120 and uses the signals obtained from the PDs for phase difference detection.

Figure 3:
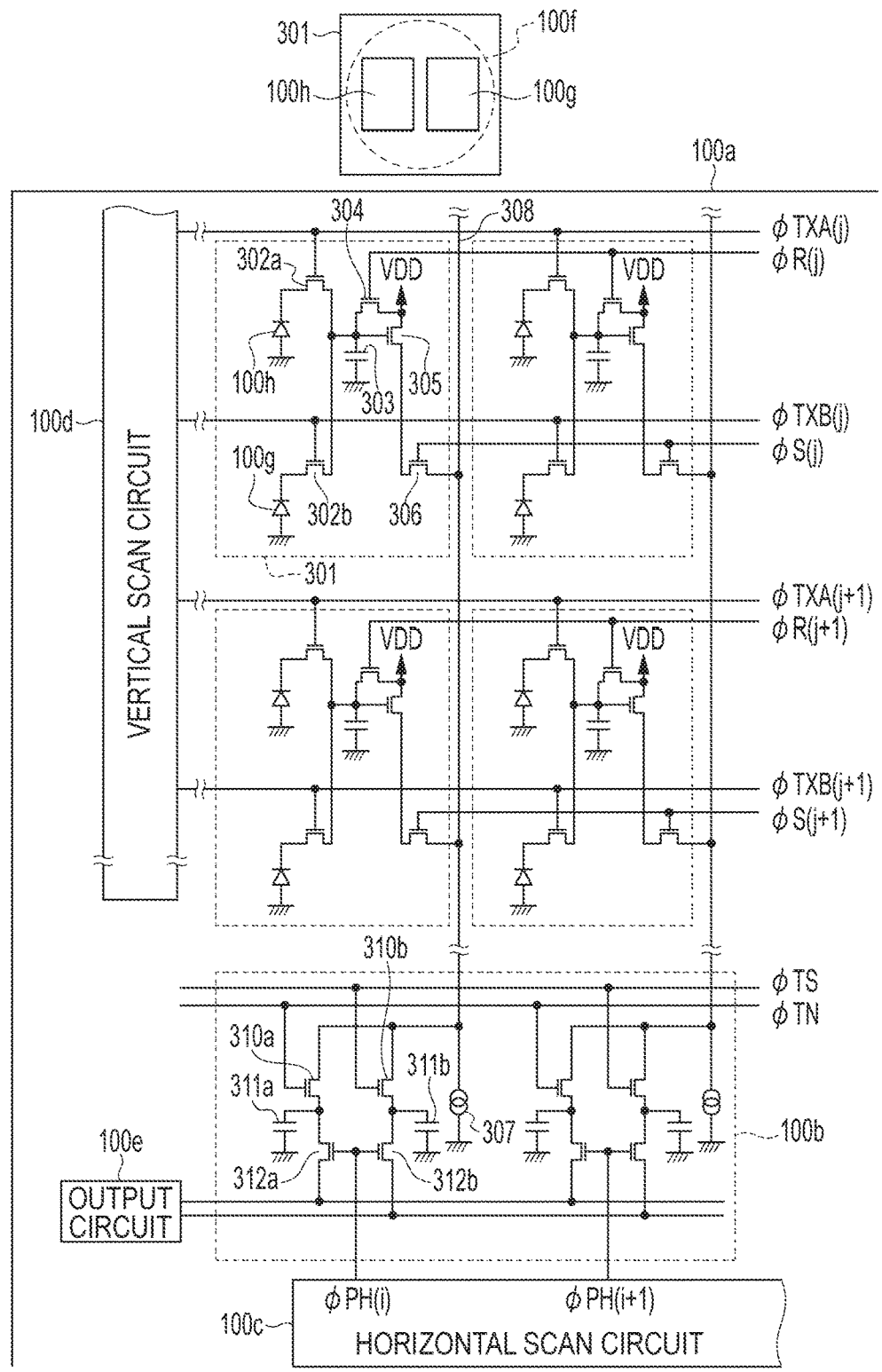
FIG. 3 is a diagram describing an equivalent circuit of the pixel.

The embodiment will be described below by the configuration in which two PDs are arranged for one micro lens. FIG. 3 is an equivalent circuit diagram illustrating a configuration of pixels in two adjacent rows (j-th row and (j+1)-th row) and two columns (i-th column and (i+1)-th column), out of a plurality of pixels provided in the pixel array 100a, and readout circuits 100b for the two columns (i-th column and (i+1)-th column).

A control signal ΦTXA(j) is input into a transfer switch 302a of a pixel 301 in the j-th row, and a control signal ΦTXB(j) is input into the gate of a transfer switch 302b. A reset switch 304 is controlled by a reset signal ΦR(j). The control signals ΦTXA(j) and ΦTXB(j), the reset signal ΦR(j), and a row selection signal ΦS(j) are controlled by the vertical scan circuit 100d. Similarly, a pixel 320 in the (j+1)-th row is controlled by control signals ΦTXA(j+1) and ΦTXB(j+1), a reset signal ΦR(j+1), and a row selection signal ΦS(j+1).

Vertical signal lines 308 are provided in the pixel rows. The vertical signal lines 308 are connected to current sources 307 and transfer switches 310a and 310b of the readout circuits 100b provided in the individual columns.

A control signal ΦTN is input into the gate of the transfer switch 310a, and a control signal ΦTS is input into the gate of the transfer switch 310b. A column selection signal ΦPH(i) output from the horizontal scan circuit 100c is input into the gates of a transfer switch 312a and a transfer switch 312b. An accumulation capacitor unit 311a accumulates outputs of the vertical signal lines 308 when the transfer switch 310a is in the on state and the transfer switch 312a is in the off state. Similarly, an accumulation capacitor unit 311b provides the outputs of the vertical signal lines 308 when the transfer switch 310b is in the on state and the transfer switch 312b is in the off state.

When the transfer switch 312a and the transfer switch 312b in the i-th column are turned on by the column selection signal ΦPH(i) of the horizontal scan circuit 100c, the outputs of the accumulation capacitor unit 311a and the accumulation capacitor unit 311b are transferred to the output circuit 100e via different horizontal output lines.

As readout operations of reading signals from the thus configured imaging element 100, an addition readout operation (first readout operation) and a division readout operation (second readout operation) can be selectively performed. The addition readout operation and the division readout operation will be described below with reference to FIGS. 3 and 6. In the embodiment, the switches are turned on when the control signals are high (H), and the switches are turned off when the control signals are low (L).

<Addition Readout Operation> (First Readout Operation)

Figure 4A:
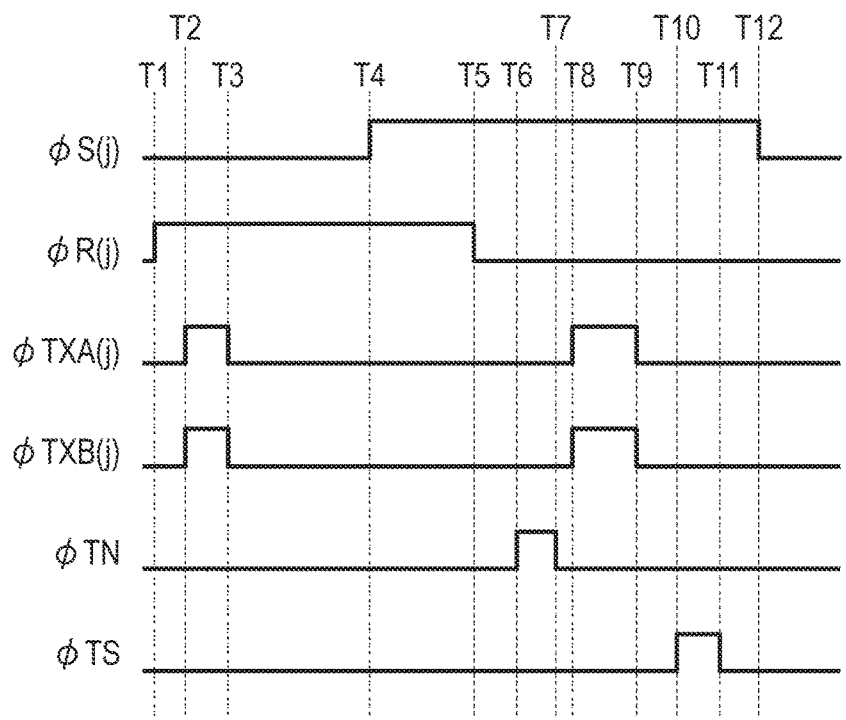
FIG. 4A is a diagram describing timings for an addition readout operation by the imaging element.

FIG. 4A illustrates timings for reading signals from the pixels in the j-th row of the imaging element 100 by the addition readout operation. At time T1, the reset signal ΦR(j) becomes H. Then, when the control signals ΦTXA(j) and ΦTXB(j) become H at time T2, the PDs 100h and 100g of the pixels 100f in the j-th row are reset.

Next, when the control signals ΦTXA(j) and ΦTXB(j) become L at time T3, the PDs 100h and 100g start charge accumulation. Subsequently, when the row selection signal ΦS(j) becomes H at time T4, a row selection switch 306 turns on and connects to the vertical signal line 308, and a source follower amplifier 305 enters into an operational state.

Next, when the reset signal ΦR(j) is turned into L at time T5 and then the control signal ΦTN becomes H at time T6, the transfer switch 310a turns on to transfer a signal (noise signal) after reset cancellation on the vertical signal line 308 to the accumulation capacitor unit 311a.

Next, the control signal ΦTN is turned into L at time T7 and the noise signal is held in the accumulation capacitor unit 311a. After that, when the control signals ΦTXA(j) and ΦTXB(j) become H at time T8, the electric charges in the PDs 100h and 100g are transferred to a floating diffusion region (FD region) 303. At this time, the electric charges in the two PDs 100h and 100g are transferred to the same FD region 303, and thus a signal with a mixture of the electric charges in the two PDs 100h and 100g (an optical signal for one pixel+noise signal) is output to the vertical signal line 308.

Then, the control signals ΦTXA(j) and ΦTXB(j) are turned into L at time T9. After that, when the control signal ΦTS becomes H at time T10, the transfer switch 310b turns on to transfer the signal (the optical signal for one pixel+noise signal) on the vertical signal line 308 to the accumulation capacitor unit 311b. Then, the control signal ΦTS is turned into L at time T11, the optical signal for one pixel+noise signal is held in the accumulation capacitor unit 311b, and then the row selection signal ΦS(j) is turned into L at time T12.

After that, the transfer switches 312a and 312b are turned into H in sequence from the first pixel column to the final pixel column by the column selection signal ΦPH of the horizontal scan circuit 100c. Accordingly, the noise signal in the accumulation capacitor unit 311a and the optical signal for one pixel+noise signal in the accumulation capacitor unit 311b are transferred to the output circuit 100e via different horizontal output lines. The output circuit 100e calculates a difference between the two horizontal output lines (the optical signal for one pixel), and outputs a signal obtained by multiplying the difference by a predetermined gain. In the following description, the signal obtained by the foregoing addition readout operation will be called "first additional signal."

<Division Readout Operation> (Second Readout Operation)

Figure 4B:
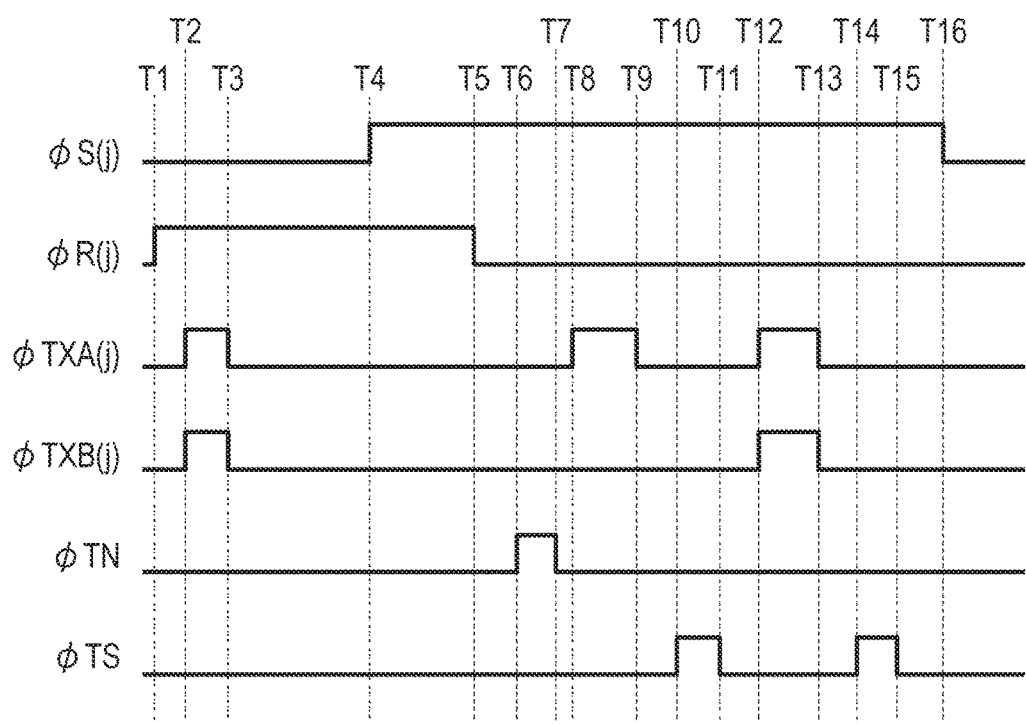
FIG. 4B is a diagram describing timings for a division readout operation by the imaging element.

Next, the division readout operation will be described with reference to FIG. 4B. FIG. 4B illustrates timings for reading signals from the pixels in the j-th row of the imaging element 100 by the division readout operation. At time T1, the reset signal ΦR(j) is turned into H. Subsequently, when the signals ΦTXA(j) and ΦTXB(j) become H at time T2, the PDs 100h and 100g of the pixel 301 in the j-th row are reset. Next, when the control signals ΦTXA(j) and ΦTXB(j) become L at time T3, the PDs 100h and 100g start charge accumulation. Subsequently, when the row selection signal ΦS(j) becomes H at time T4, the row selection switch 306 turns on and connects to the vertical signal line 308, and the source follower amplifier 305 enters into an operational state.

After the reset signal ΦR(j) is turned into L at time T5, when the control signal ΦTN becomes H at time T6, the transfer switch 310a turns on to transfer the signal after reset cancellation on the vertical signal line 308 (noise signal) to the accumulation capacitor unit 311a.

Next, the control signal ΦTN is turned into L and the noise signal is held in the accumulation capacitor unit 311*a* at time T7. After that, when the signal ΦTXA(j) becomes H at time T8, the electric charges in the PD 100*h* are transferred to the FD region 303. Since the electric charges in one of the two PDs 100*h* and 100*g* (the PD 100*h* in this example) are transferred to the FD region 303, only the signals corresponding to the electric charges in the PD 100*h* are output to the vertical signal line 308.

When the control signal ΦTXA(j) is turned into L at time T9 and then the control signal ΦTS becomes H at time T10, the transfer switch 310*b* turns on to transfer the signal on the vertical signal line 308 (the optical signal for one PD+noise signal) to the accumulation capacitor unit 311*b*. Next, the control signal ΦTS is turned into L at time T11.

After that, the transfer switches 312*a* and 312*b* from the first pixel column to the final pixel column are turned into H in sequence by the column selection signal ΦPH of the horizontal scan circuit 100*c*. Accordingly, the noise signal from the accumulation capacitor unit 311*a* and the optical signal for one PD+noise signal from the accumulation capacitor unit 311*b* are transferred to the output circuit 100*e* via different horizontal output lines. The output circuit 100*e* calculates the difference between the two horizontal output lines (the optical signal for one PD) and outputs the signal obtained by multiplying the difference by a predetermined gain. In the following description, the signal obtained by the readout described above will be called "divisional signal."

After that, the signals ΦTXA(j) and ΦTXB(j) become H at time T12. Accordingly, in addition to the previously transferred electric charges in the PD 100*h*, the electric charges in the PD 100*g* and newly generated electric charges in the PD 100*h* are transferred to the FD region 303. Since the electric charges in the two PDs 100*h* and 100*g* are transferred to the same FD region 303, the signal obtained by mixing the electric charges in the two PDs 100*h* and 100*g* (optical signal for one pixel+noise signal) is output to the vertical signal line 308.

Subsequently, when the control signals ΦTXA(j) and ΦTXB(j) are turned into L at time T13 and then the control signal ΦTS becomes H at time T14, the transfer switch 310*b* turns on. Accordingly, the signal on the vertical signal line 308 (optical signal for one pixel+noise signal) is transferred to the accumulation capacitor unit 311*b*.

Next, the control signal ΦTS is turned into L at time T15 and the optical signal for one pixel+noise signal is held in the accumulation capacitor unit 311*b*. Then, the row selection signal ΦS(j) is turned into L at time T16.

After that, the transfer switches 312*a* and 312*b* from the first pixel column to the final pixel column are turned into H in sequence by the column selection signal ΦPH of the horizontal scan circuit 100*c*. Accordingly, the noise signal and the optical signal for one pixel+noise signal in the accumulation capacitor units 311*a* and 311*b* are transferred to the output circuit 100*e* via different horizontal output lines. The output circuit 100*e* calculates the difference between the two horizontal output lines (optical signal for one pixel) and outputs the signal obtained by multiplying the difference by a predetermined gain. In the following description, the signal obtained by the readout operation described above will be called "second additional signal" to differentiate from the first additional signal.

The divisional signal corresponding to the one PD 100*h* is subtracted from the second additional signal read as described above to obtain a divisional signal corresponding to the other PD 100*g*. The pair of divisional signals obtained as described above will be called "focus detection signals."

The obtained focus detection signals can be subjected to a conventional correlation calculation to determine the phase difference between the signals.

The series of operations including resetting, charge accumulation, and signal readout may be performed on the PD 100*h*, and then the same operations may be performed on the PD 100*g* to read independently the signals from the two PDs 100*h* and 100*g* by one charge accumulation operation. The signals read from the PDs 100*h* and 100*g* by two times can be added up to obtain the second additional signal. In addition, as described above, the disclosure is not limited to the configuration in which two PDs are arranged for one micro lens but may be configured such that signals are read in a plurality of steps from three or more PDs and are combined.

Reading noise in the second additional signal is larger as compared to the first additional signal. For example, in the case of reading simultaneously the signals from the two PDs 100*h* and 100*g*, the noise signal is read first to acquire the second additional signal. Then, the electric charges in one of the two PDs 100*h* and 100*g* are transferred to the FD region 303 to read the signal, and then the signals are simultaneously read from the two PDs 100*h* and 100*g* without resetting the FD region 303 to obtain the second additional signal. According to this method, it takes longer time between to read the noise signal and to read the second additional signal than between to read the noise signal and to read the first additional signal. The longer time decreases the operating frequency range between the signals and increases flicker noise.

In addition, in the case of reading independently the signals from the PDs 100*h* and 100*g*, for example, the pixel signal is obtained by reading the single pixel twice and adding up the read signals. This means that the reading noise is superimposed twice. Accordingly, the second additional signal increases reading noise as compared to the first additional signal.

Figure 5:
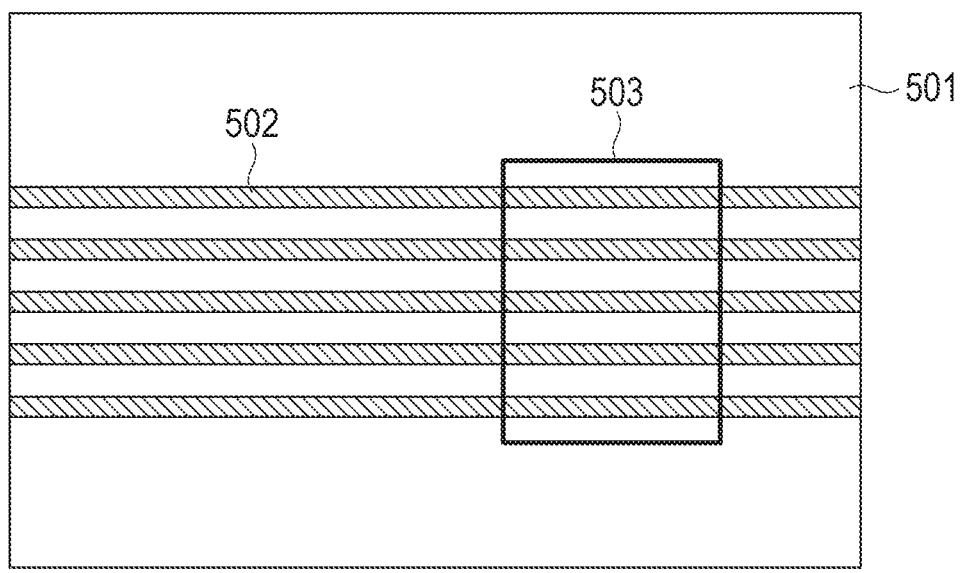
FIG. 5 is a diagram describing an example of selective drive control at the time of one-frame reading.

FIG. 5 is a diagram describing a reading method in a pixel array in which pixels are arrayed in a matrix. By controlling the switch 302*a* and the switch 302*b* as described above, it is possible to switch between the addition readout operation and the division readout operation. A white solid region 501 illustrated in FIG. 5 is a region in which the addition readout operation is performed to read simultaneously the signal for image A and the signal for image B. A hatched region 502 is a region in which the division readout operation is performed to read the signal for image A, and then read simultaneously the signal for image A and the signal for image B. A distance measurement region 503 for focus detection is decided within a screen, and the focus detection is performed on the subject corresponding to this region. The distance measurement region is set by user setting, touch panel operation, or the like. However, the distance measurement region does not always occupy only part of the image region but can occupy the entire image depending on the situation of the subject. In addition, FIG. 5 illustrates the distance measurement region 503 in a rectangular shape but the distance measurement region 503 may be formed in an arbitrary shape.

In the following description, the readout operation is switched by line within the screen as an example, but the disclosure is not limited to this. For example, the screen may be divided into a plurality of rectangular regions so that the reading method may be switched among rectangular region. Under normal circumstances, it is preferable for focus detection that the division readout operation is performed on the pixels included in all the rows where the distance measurement region 503 overlays. Considering a processing load, however, the division readout operation is performed in only some of the rows as illustrated in FIG. 5. The rows where the division readout operation is to be performed are decided under a specific rule. For example, both the number of the rows where the division readout is to be performed and the distance between the rows may be changed as appropriate depending on the size of the distance measurement region 503, or the distance between the rows where the division readout is to be performed may be fixed and only the number of the rows may be larger as the size of the distance measurement region 503 increases. In either case, when the position and the size of the distance measurement region 503 are decided, the reading methods of the individual pixels are determined. In addition, in the example, the readout operation is switched between the rows extending in the horizontal direction, but the readout operation may be switched between the columns extending in the vertical direction.

Figure 6:
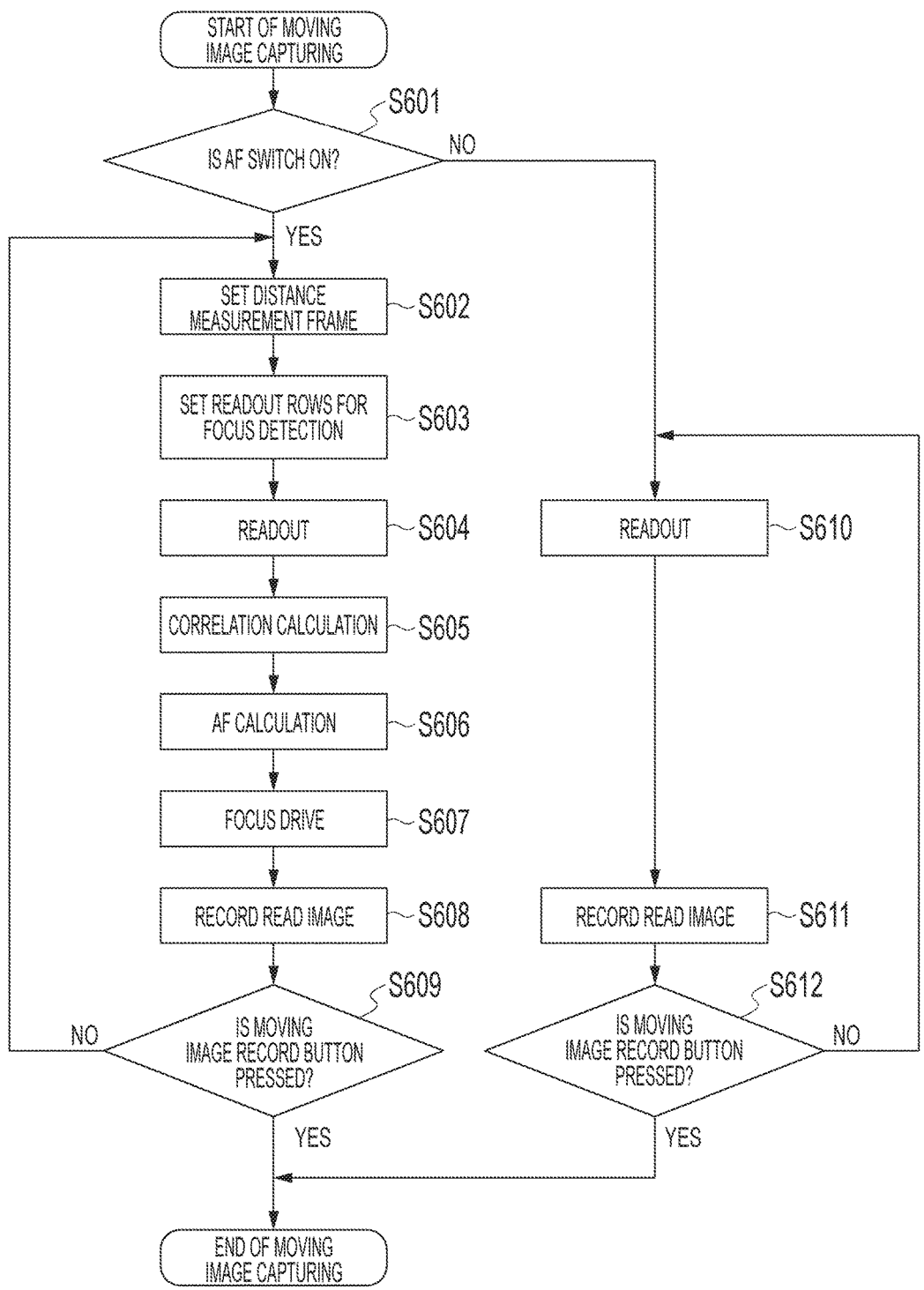
FIG. 6 is a flowchart of moving image capturing.

FIG. 6 is a flowchart of moving image capturing. In a moving image mode, a moving image record button included in the operation unit 104 is pressed to start capturing of a moving image. When the capturing of a moving image is started, the CPU 103 checks the state of an AF switch at step S601. When the AF switch is in the OFF state, the capturing of a moving image is performed in a manual focus mode (MF) mode. After the determination at step S601, the CPU 103 moves the process to step S610. At step S610, there is no need to perform the division readout operation to obtain a focus detection signal, and under the control of the CPU 103, the addition readout operation is performed to read simultaneously the signals for image A and the signals for image B from all the pixels. After that, the image read at step S611 is saved in the RAM 106. Next, the CPU 103 moves the process to step S612. When the moving image record button was pressed during the sequence, the capturing of the moving image is ended, and when the button is not pressed, the reading of the next frame is started.

Meanwhile, it is determined at step S601 that the AF switch is in the ON state, the capturing of a moving image is performed in a motion picture servo AF mode under the control of the CPU 103. At step S602, the CPU 103 sets the distance measurement region 503. The distance measurement region 503 may be set by a conventionally known method. For example, the position of the distance measurement region 503 is set through the user's operation on the touch panel or the dial. Alternatively, a tracking process may be performed on the subject seen in the image to detect the position of the subject in a new frame, and the distance measurement region 503 may be set based on the detected position and size of the subject. At step S603, the CPU 103 sets the region 502 for the division readout operation according to the distance measurement region 503 set at step S602. Step S603 will be described later with reference to FIGS. 7 and 8.

At step S604, the signals are read from the pixels under the control of the CPU 103 by the reading method set at step S603. The CPU 103 drives the TG 102 and controls the vertical scan circuit 100d and the switch 302a and the switch 302b to read the signals from the pixels. Specifically, in the region 502 with some of the rows overlaying the distance measurement region 503, first, the switch 302a is turned on to read the signal for image A. Then, the switch 302a and the switch 302b are turned on simultaneously to read the signal for image A and the signal for image B simultaneously. The image processing unit 108 described later can calculate the signal for image B by the use of this signal and the signal obtained when only the switch 302a was turned on. Accordingly, both the signal for image A and the signal for image B are acquired as focus detection signals. In the other rows (the region 501), the switch 302a and the switch 302b are turned on simultaneously to read the signal for image A and the signal for image B simultaneously.

At step S605, the correlation calculation unit 120 performs a correlation calculation based on the signals read from the region 502 at step S604. At step S606, the AF calculation unit 109 performs an AF calculation based on the result of the correlation calculation at step S605. Specific methods of the correlation calculation and the AF calculation are omitted here. Then, at step S607, the result of the AF calculation is sent to the focus drive circuit 112 to conduct focus driving.

At step S608, the CPU 103 records the image read at step S604 in the RAM 106 and moves the process to step S609. At step S609, it is determined whether the moving image record button was pressed during the sequence. When the moving image record button was pressed, the CPU 103 ends the capturing of the moving image. When the moving image recording button was not pressed, the CPU 103 returns the process to step S602 to repeat the same operation.

Figure 7:
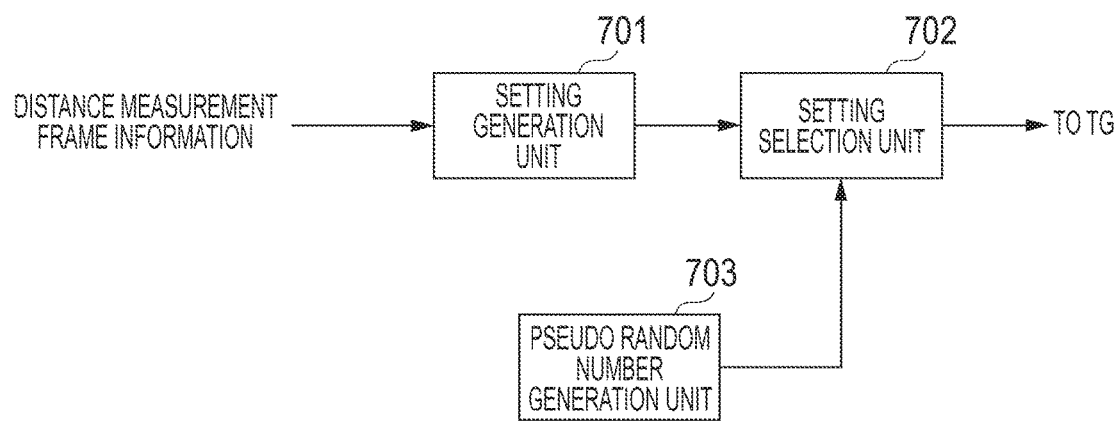
FIG. 7 is a block diagram describing a configuration for region setting in a first embodiment.

FIG. 7 is a block diagram describing a configuration for region setting in the embodiment. The region setting here refers to setting on which kind of readout operation is to be performed in which region within the screen. In the embodiment, this setting is implemented by a program in the CPU 103 and is transmitted to the TG 102, but the disclosure is not limited to this. For example, as constituent elements of the image capture apparatus, a setting generation unit and a setting selection unit may be provided separately from the CPU 103.

A setting generation unit 701 in the CPU 103 receives information on the distance measurement region 503 and generates a plurality of region settings. A setting selection unit 702 selects at random one of the plurality of region settings generated by the setting generation unit 701, by inputting a random number generated by a pseudo random number generation unit 703, and transmits the same to the TG 102.

Figure 8:
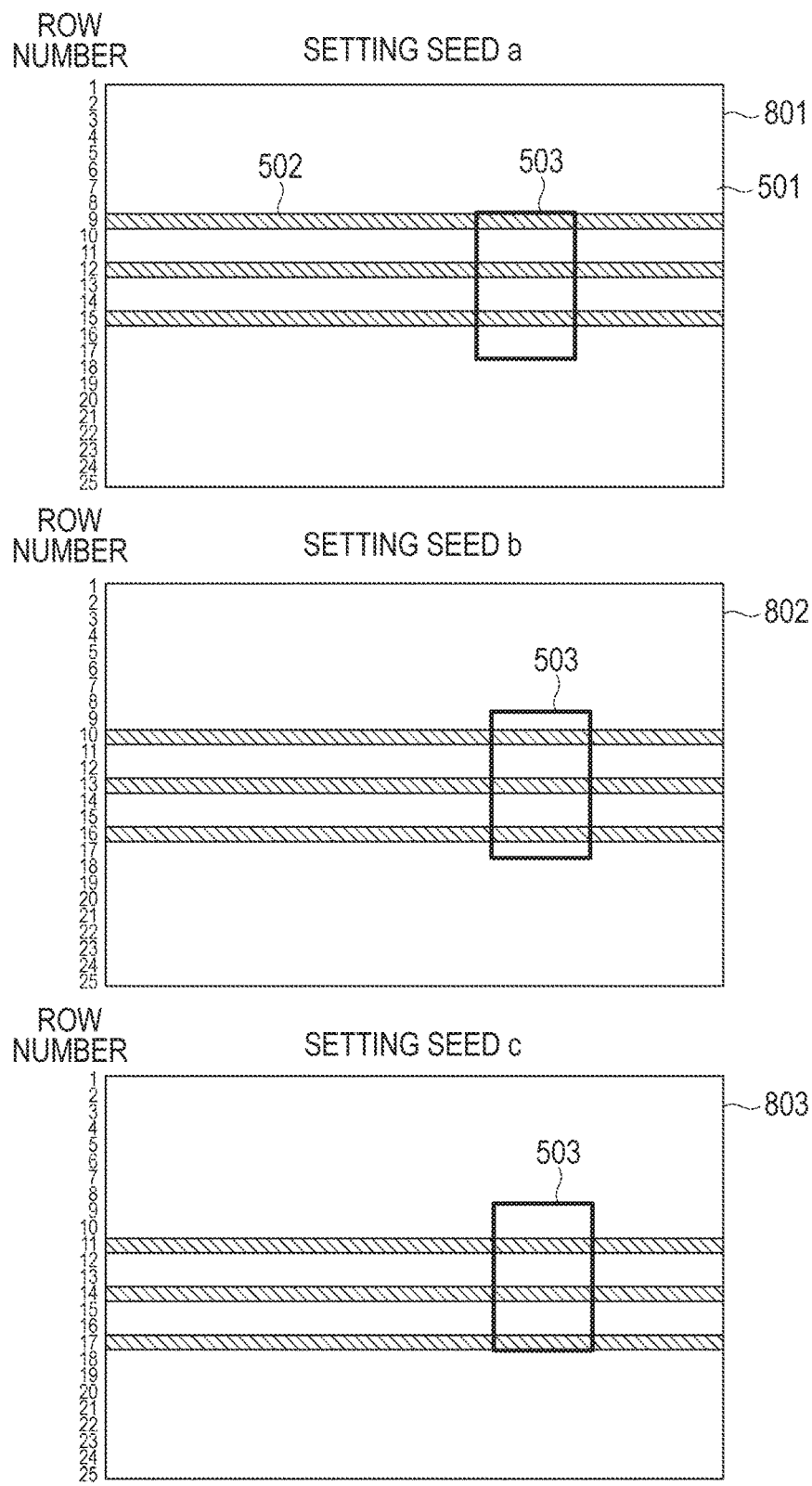
FIG. 8 is a diagram describing different examples of region settings.

FIG. 8 is a diagram describing examples of the region settings generated by the setting generation unit 701. An image 801 is an example of region setting a in the distance measurement region 503. An image 802 is an example of region setting b in the distance measurement region 503. An image 803 is an example of region setting c in the distance measurement region 503. The positions of the distance measurement regions 503 are identical among the images 801 to 803, but the rows where the division readout operation is to be performed are different among the images 801 to 803. Setting patterns a, b, and c in the region settings are called setting seeds. In the embodiment, the settings are made such that, when the setting seeds a, b, and c are selected once in three frames, the division readout operation is performed once in all the rows overlaying the distance measurement region.

Figure 9:
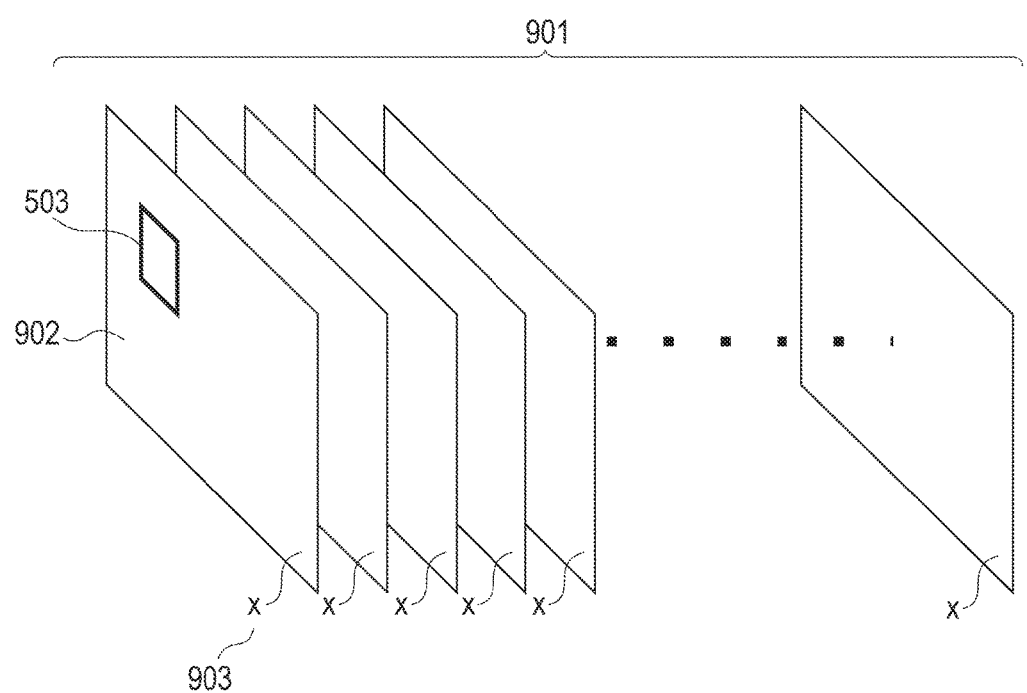
FIG. 9 is a diagram describing region setting in a plurality of frames in the first embodiment.

In the following description, the embodiment is applied to the capturing of continuous frames. FIG. 9 is a diagram describing an example in which the embodiment is applied to the capturing of continuous frames. A frame group 901 is a frame group that is generally treated as one file such as a multi-exposed image file, a moving image file, or a plurality of images continuous in time series. However, the frame group 901 is not limited to the foregoing ones but may be a plurality of frames equal in the distance measurement region. A frame 902 is one frame of the frame group 901.

The symbol x appended to reference sign 903 represents any one of the region settings a, b, and c, which is determined at random by the pseudo random number input into the setting selection unit 702.

According to the embodiment, it is possible to switch between the regions where the division readout operation is to be performed at random in each frame even when a plurality of frames is captured in the same distance measurement region. By switching between the regions at random, it is possible to, when a quite large number of frames is captured, suppress the situation in which the division readout operation is performed heavily on limited ones of the pixels. This makes less prominent the difference in the level of the noise signal between the regions in the imaging element.

Second Embodiment

A second embodiment will be described with reference to FIGS. 10 and 11. The same components as those of the first embodiment are omitted.

Figure 10:
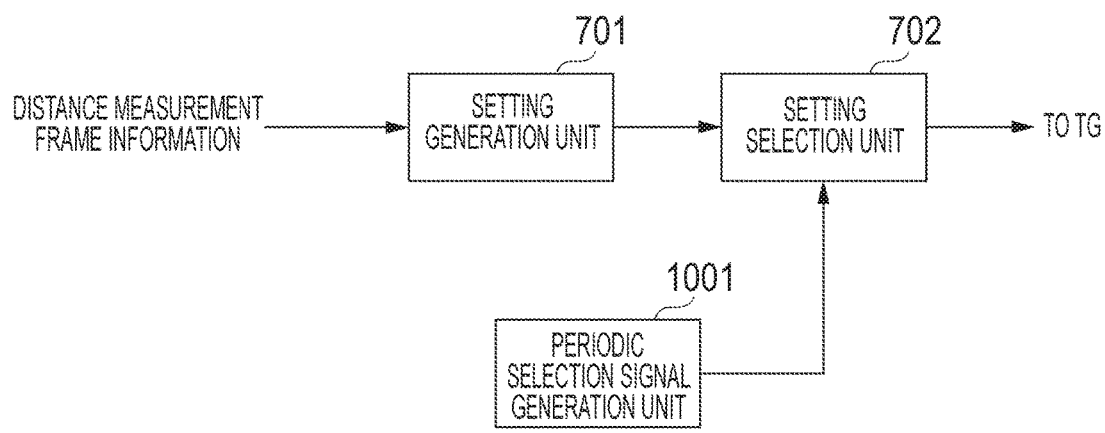
FIG. 10 is a block diagram describing a configuration for region setting in a second embodiment.
Figure 11:
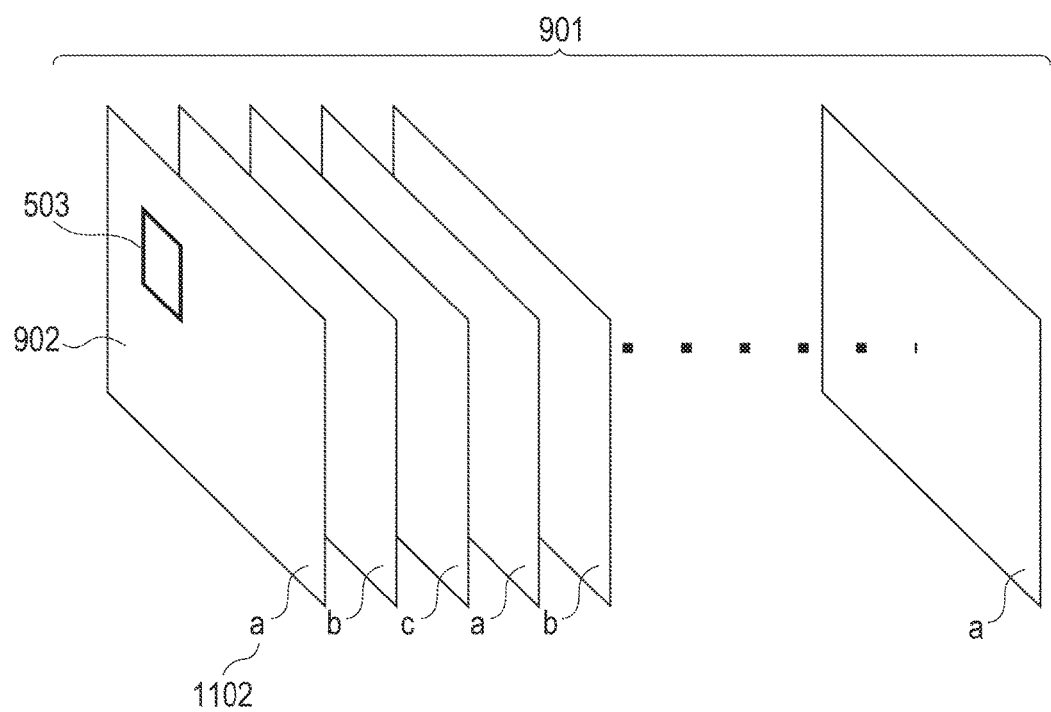
FIG. 11 is a diagram describing region setting in a plurality of frames in the second embodiment.

FIG. 10 is a diagram describing region settings in the embodiment. The region settings generated by the setting generation unit 701 can be selected on a periodically by inputting a periodic selection signal generated by a periodic selection signal generation unit 1001 into the setting selection unit 702. By the periodic selection, the same setting seeds a, b, and c as those in the first embodiment are set to the frames of the frame group 901 on a periodic basis as illustrated in FIG. 11.

According to the embodiment, even when a plurality of frames is captured in the same distance measurement region, it is possible to switch between the regions where the division readout operation is to be performed on a periodic basis in each frame. By the periodic switching, the division readout operation is performed on every pixel in the smallest number of frames. This makes less prominent the difference in the level of the noise signal between the regions in the imaging element.

Third Embodiment

A third embodiment will be described mainly regarding the differences from the second embodiment. The third embodiment is different from the second embodiment in the following respects: first, the image processing unit 108 has the function of generating one composite image from images in a plurality of frames or correcting an image; and second, the overlapping of the pixels on which the division readout operation is performed between the plurality of frames for use in the image processing is set to be minimum.

Figure 12A:
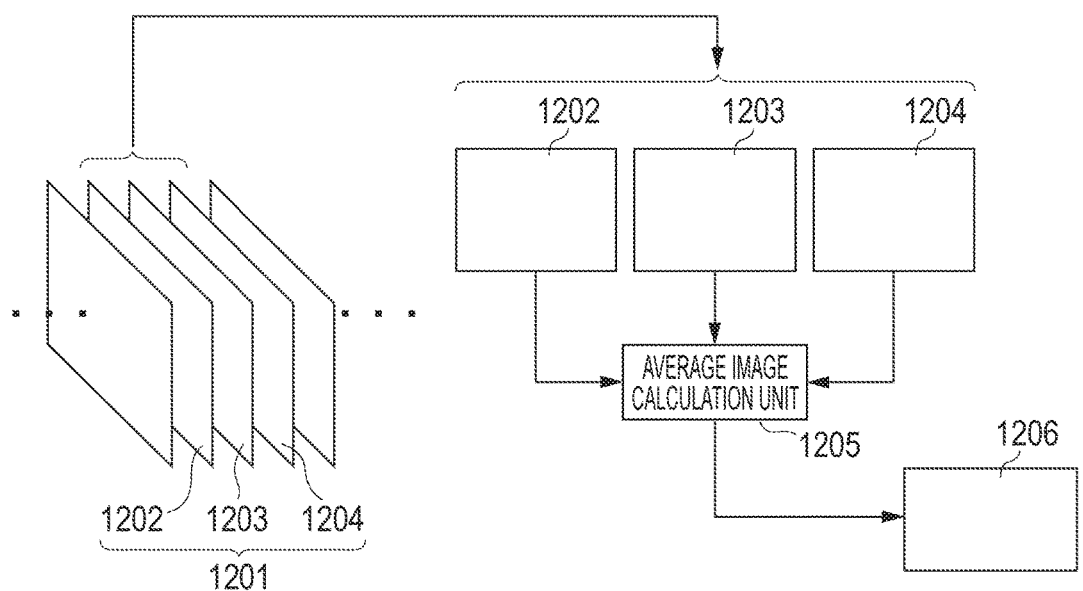
FIG. 12A is a diagram describing noise reduction in a third embodiment and FIG. 12B is a diagram describing a process of noise reduction by an average image calculation unit in the third embodiment.

FIG. 12A is a diagram describing a noise reduction process to correct one image using images in a plurality of frames. The images in the plurality of frames are images of the same subject captured under the same condition. A frame group 1201 includes three frames for use in the noise reduction process. In the example, the noise reduction process is performed with the three frames, but the disclosure is not limited to this. Frames 1202, 1203, and 1204 constitute the previous frame captured before the target frame of the noise reduction process, the target frame of the noise reduction process, and the next frame captured after the target frame of the noise reduction process, respectively.

Figure 12B:
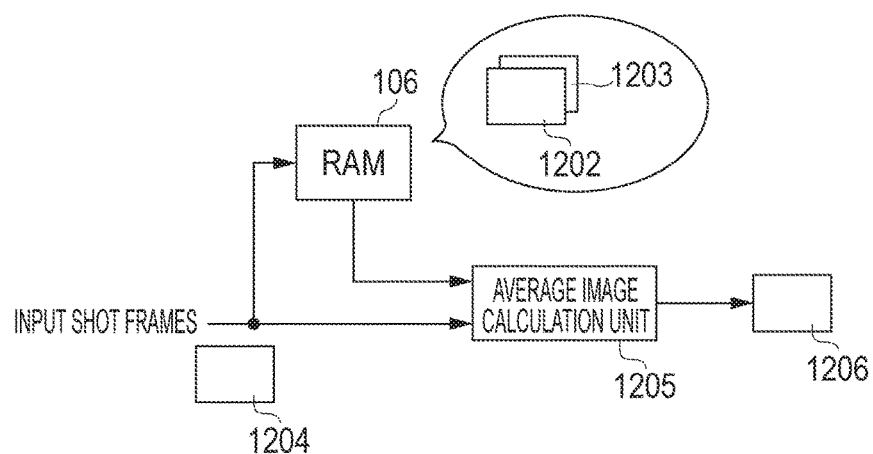

FIG. 12B is a block diagram describing the process performed by an average image calculation unit. The read frames are stored in the RAM 106 and input into an average image calculation unit 1205. When the new frame 1204 is input, the average image calculation unit 1205 reads the one-preceding frame 1203 and the two-preceding frame 1202 from the RAM, and calculates the average of these three frames. As the result of the average calculation, a corrected frame 1206 corresponding to the middle frame 1203 can be obtained.

In the noise reduction process of the embodiment, one image is corrected using three images. When the division readout operation is performed on the pixels at the same position in the three images, noise may increase in the rows where the division readout operation was performed as described above. To perform more effectively the noise reduction process by averaging, ideally, the division readout operation is desirably performed on different pixels in the three frames.

Figure 13:
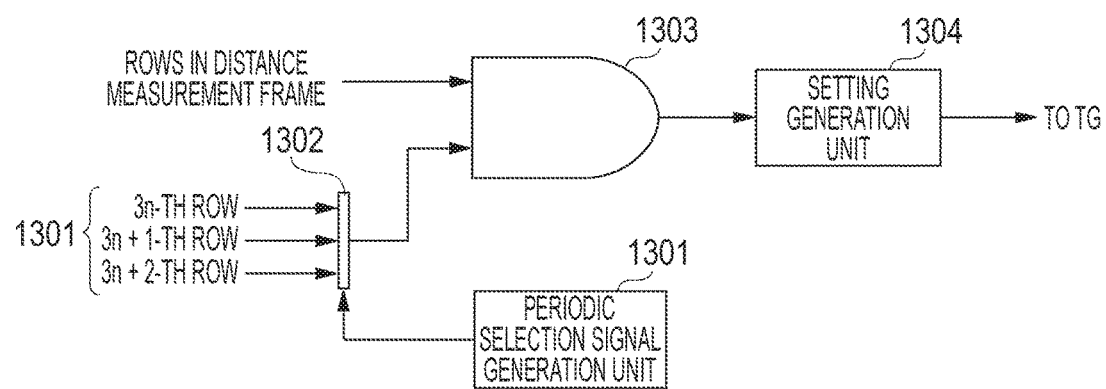
FIG. 13 is a block diagram describing a configuration for region setting in the third embodiment.

By sufficiently increasing the number of the setting seeds and selecting the setting seeds on a periodic basis, the images of three frames for use in averaging can be obtained so as not to perform the division readout operation twice in any row. Specifically, by generating at least a number of setting seeds that is equal to or more than the largest number of frames for use in averaging, the division readout operation is not performed on overlapping pixels in any case. For example, to generate one image from three images, at least three setting seeds are prepared. To implement the noise reduction process, the settings as illustrated in FIG. 13 are necessary. A periodic selection signal generation unit 1301 decides in what rows within the screen the division readout operation is to be performed. A selector 1302 receives and selects a signal of the periodic selection signal generation unit 1301 from signals of the row setting unit. A condition determination unit 1303 sets rows with a match between the information on rows where the distance measurement region overlays and the settings in the selector 1302, as rows in which the division readout operation is to be performed. A setting generation unit 1304 receives the information from the condition determination unit 1303 and transmits the same to the TG.

However, the pixels on which the division readout operation is to be performed may not be necessarily set without overlapping at any time by the method described above. For example, in the case where the division readout operation is performed in half or more of the rows where the distance measurement region overlays to perform the noise reduction process to correct one image by the use of three images, it is not possible to change the pixels on which the division readout operation is performed in all the images. In such a case, the region setting is restricted such that the overlapping of the pixels where the division readout operation is to be performed between the images for use in generation of an image becomes minimum.

Figure 14:
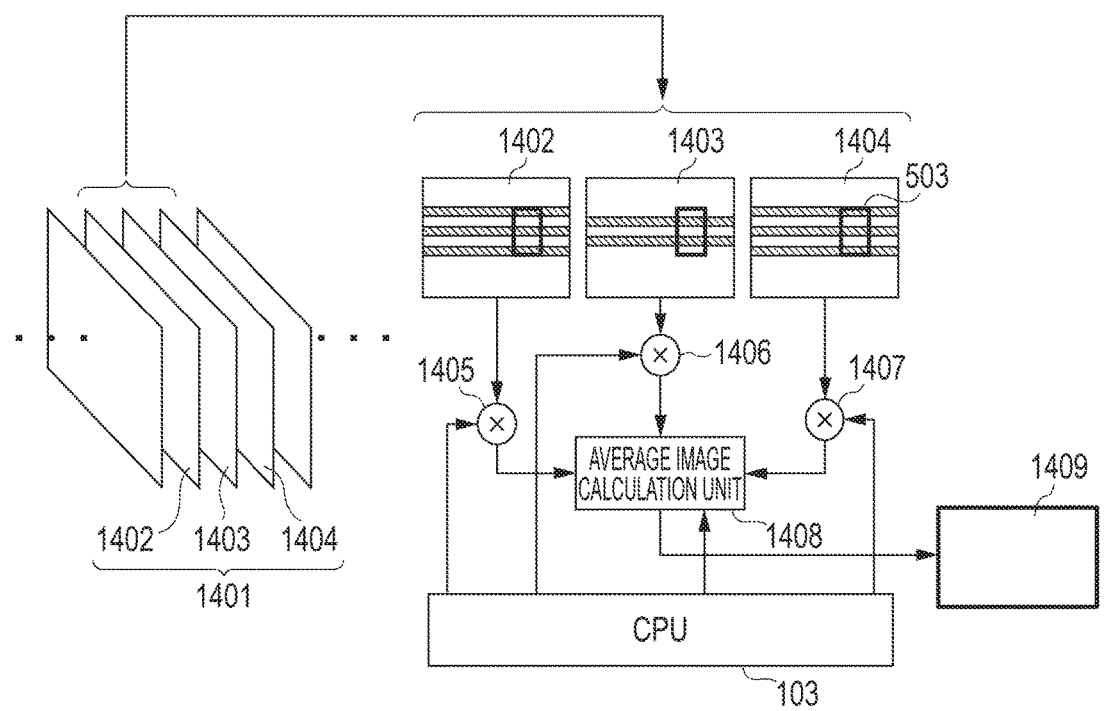
FIG. 14 is a diagram describing noise reduction in the third embodiment.

FIG. 14 illustrates an example in which, at the time of noise reduction process by the use of three images, the division readout operation is performed in half or more of the rows where the distance measurement region overlays. A frame group 1401 is an image for use in the noise reduction process. The frame group 1401 includes frames 1402, 1403, and 1404. The frames 1402, 1403, and 1404 constitute a preceding frame captured immediately before the target frame 1403 of the noise reduction process, the target frame of the noise reduction process, and the following frame captured immediately after the target frame 1403 of the noise reduction, respectively. A distance measurement region 503 is common among these frames, and the division readout operation is performed in half of the rows within the distance measurement region 503 in one frame. Accordingly, the division readout operation is performed in the same rows of the preceding frame 1402 and the following frame 1404.

In such a case, a weighted average process is performed to assign weights to the frames or the pixels depending on the number of times when an overlap occurs between the pixels where the division readout operation is performed. A weighting unit 1405 assigns a weight to the preceding frame 1402 using a coefficient acquired from the CPU 103. A weighting unit 1406 assigns a weight to the target frame 1403 using a coefficient acquired from the CPU 103. A weighting unit 1407 assigns a weight to the following frame 1404 using a coefficient acquired from the CPU 103. In this example, the division readout operation is performed in the same rows of the preceding frame 1402 and the following frame 1404, and therefore the coefficients of the weighting unit 1405 for the preceding frame and the weighting unit 1407 for the following frame are set to 0.25, and the coefficient of the weighting unit for the processing target frame is set to 0.5.

An average image calculation unit 1408 acquires information on the coefficients from the CPU 103, calculates weighted average of the images by an appropriate method, and outputs the same to a corrected frame 1409.

By the foregoing method, multi-exposure imaging can be performed to acquire images of the same subject captured with different exposure values. Alternatively, a cyclic filter can be formed to perform the noise reduction process using images generated in time series by the foregoing method.

According to the embodiment, in the case of generating or correcting one image by using images in a plurality of frames, it is possible to switch between the regions where the division readout operation is performed on a periodic basis while minimizing an overlap between the pixels where the division readout operation is performed. In addition, even with an overlap between the pixels where the division readout operation is performed, it is possible to perform the process with reduction in the influence of the overlap.

Fourth Embodiment

Figure 15:
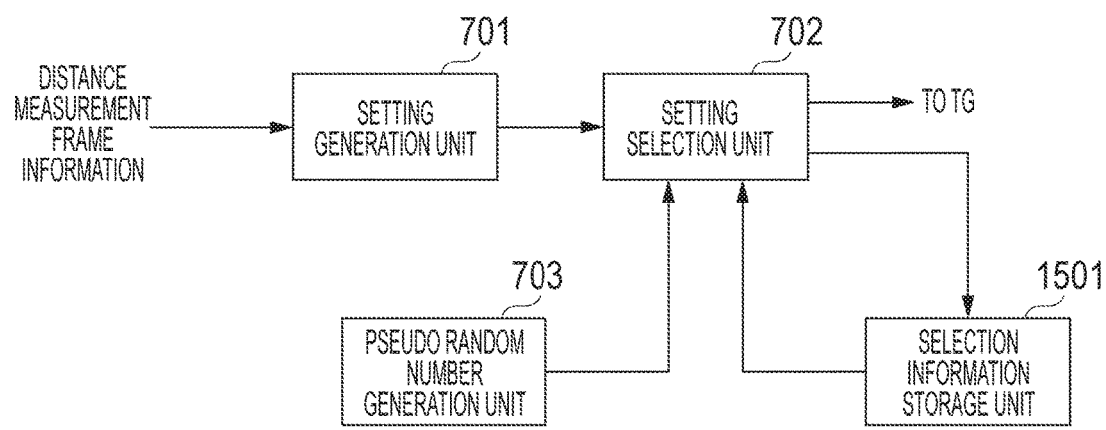
FIG. 15 is a block diagram describing a configuration for region setting in a fourth embodiment.

A fourth embodiment will be described with reference to FIG. 15. The description of the same contents as those of the first embodiment are omitted.

The fourth embodiment is different from the first embodiment in control of the setting selection unit 702. In the second embodiment, the setting seeds are selected on the basis of the random numbers generated by the pseudo random number generation unit 703. In the fourth embodiment, in addition to this, a selection information storage unit 1501 stores information relating to the selection of the setting seeds, and the setting selection unit 702 selects the setting seeds later with reference to the information stored in the selection information storage unit 1501.

For noise reduction, it is preferable to avoid using the same setting seed more than once as much as possible. Accordingly, the usage of the setting seeds is restricted such that an already used setting seed is not used anymore or is used only a specific number of times, with reference to the information on the setting seeds stored in the selection information storage unit 1501.

For example, it is assumed that the same setting seed is not to be used twice within a predetermined period of time and the setting seed a is already used once. In this case, to avoid the setting selection unit 702 from selecting the setting seed a again, even though the setting seed a is decided again on the basis of the random number generated by the pseudo random number generation unit 703, the setting seed a is not used and the pseudo random number generation unit 703 is caused to generate a random number once more. Alternatively, the program in the pseudo random number generation unit 703 is modified to exclude the setting seed a from the calculation result.

In addition, the selection information storage unit 1501 may store the information on in which rows the division readout operation was performed, instead of storing the setting seeds. In this case, it is preferable to make a setting such that the division readout is not performed more than a specific number of times in the individual rows.

According to the embodiment, by storing the history of selection of the setting seeds, it is possible to avoid the appearance of the same setting seed more than a specific number of times or prevent the division readout from being performed in a specific row more than a specific number of times. This makes less prominent the difference in the level of the noise signal between the regions in the imaging element.

Other Embodiments

The foregoing embodiment has been described so far based on a digital camera. However, the disclosure is not limited to a digital camera. For example, the disclosure may be carried out in any other device or apparatus capable of performing the imaging function such as a mobile device with a built-in imaging element or a network camera capable of acquiring images.

The disclosure can also be implemented by supplying a program for performing one or more of the functions in the foregoing embodiments, to a system or an apparatus via a network or a storage medium, causing one or more processors of a computer in the system or the apparatus to read and operate the program. Alternatively, the disclosure can also be implemented by a circuit performing one or more of the functions (for example, ASIC).

Preferable embodiments of the disclosure have been described so far. However, the disclosure is not limited to these embodiments but can be modified and changed in various manners within the scope of the gist of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-086549, filed Apr. 22, 2016, which is hereby incorporated by reference herein in its entirety.

What is claimed is:

1. An image capture apparatus, comprising:
   an imaging element including a plurality of pixels configured to have a plurality of photoelectric conversion units for one micro lens;
   a control circuit configured to make a first setting to set ones of the plurality of pixels in the imaging element as a first region and set other ones of the plurality of pixels as a second region, and make a second setting to set a distance measurement region for at least ones of the plurality of pixels; and
   a reading unit configured to perform a first readout operation of reading, from a first pixel included in the first region and the distance measurement region of the imaging element, signals according to electric charges accumulated in the photoelectric conversion units of the first pixel, and perform a second readout operation of reading, from a second pixel included in the second region and the distance measurement region, signals according to electric charges accumulated in the photoelectric conversion units of the second pixel, the second readout operation being different from the first readout operation, wherein
   the imaging element captures images in a plurality of frames, and when the control circuit performs the second setting to set the same distance measurement region in the images in the plurality of frames, the control circuit performs the first setting to change the position of the first region in the distance measurement region between the images in the plurality of frames at random or periodically.

2. The image capture apparatus according to claim 1, wherein
   the plurality of pixels is arranged in a matrix.

3. The image capture apparatus according to claim 2, wherein
   the readout circuit sets the first region and the second region by line.

4. The image capture apparatus according to claim 1, wherein
   the images in the plurality of frames are images continuous in time series.

5. The image capture apparatus according to claim 4, wherein,
   the images in the plurality of frames are frames of moving images.

6. The image capture apparatus according to claim 1, wherein
   the control circuit generates a composite image from the images in the plurality of frames.

7. The image capture apparatus according to claim 6, wherein
   the control circuit generates the composite image from the images in the plurality of frames generated with different exposure values.

8. The image capture apparatus according to claim 6, wherein
   the control circuit generates the composite image by applying weighting coefficients to the images in the plurality of frames and subjecting the images to weighting composition.

9. The image capture apparatus according to claim 8, wherein
   the control circuit decides the weighting coefficients to be applied to the images in the plurality of frames, based on the positions of the first regions in the individual images in the plurality of frames.

10. The image capture apparatus according to claim 9, wherein
    the control circuit decides the weighting coefficients to be applied to the images in the plurality of frames for the individual images in the plurality of frames based on the numbers of images in the other frames that are equal in the setting of the position of the first region included in the images in the plurality of frames.

11. The image capture apparatus according to claim 1, wherein
    when making the first setting, the control circuit sets the first region by selecting any one of a plurality of prepared setting patterns for the individual images in the plurality of frames, and restricts the number of times when the same setting pattern is selected.

12. The image capture apparatus according to claim 1, wherein
    when making the first setting, the control circuit sets the first region by selecting any one of a plurality of prepared setting patterns for the individual images in the plurality of frames, and restricts the number of times when the same setting pattern is selected in the same distance measurement region.

13. The image capture apparatus according to claim 1, wherein
    when making the first setting, the control circuit sets the first region such that, in a predetermined number of continuous frames out of the images in the plurality of frames, the first region is not set in the same position more than a predetermined number of frames.

14. The image capture apparatus according to claim 1, wherein
    the first readout operation is an operation of reading signals in a plurality of steps according to electric charges accumulated in a plurality of photoelectric conversion units included in the pixels in the first region and the distance measurement region, and includes a first operation of reading signals according to electric charges accumulated in predetermined ones of the plurality of photoelectric conversion units and a second operation of reading signals from photoelectric conversion units different from the predetermined photoelectric conversion units without reading the signals according to the electric charges accumulated in the predetermined photoelectric conversion units.

15. The image capture apparatus according to claim 1, wherein
    the first readout operation includes a third operation of reading signals according to electric charges accumulated in at least ones of the plurality of photoelectric conversion units included in the images in the first region and the distance measurement region, and a fourth operation of reading signals according to the electric charges accumulated in ones of the ones of the photoelectric conversion units.

16. The image capture apparatus according to claim 1, wherein
the second readout operation is an operation of reading signals additionally according to the electric charges accumulated in the plurality of photoelectric conversion units included in the pixels both in the second region and in the distance measurement region.

17. A control method of an image capture apparatus using an imaging element including a plurality of pixels configured to have a plurality of photoelectric conversion units for one micro lens, comprising:
a first setting step of setting ones of the plurality of pixels in the imaging element as a first region and setting other ones of the plurality of pixels as a second region;
a second setting step of setting a distance measurement region for at least ones of the plurality of pixels; and
a readout step of performing a first readout operation of reading, from a first pixel included in the first region and the distance measurement region of the imaging element, signals according to electric charges accumulated in the photoelectric conversion units of the first pixel, and performing a second readout operation of reading, from a second pixel included in the second region and the distance measurement region, signals according to electric charges accumulated in the photoelectric conversion units of the second pixel, the second readout operation being different from the first readout operation, wherein
the imaging element captures images in a plurality of frames, and when the same distance measurement region is set in the images in the plurality of frames at the second setting step, the position of the first region in the distance measurement region is changed between the images in the plurality of frames at random or periodically at the first setting step.

18. A non-transitory storage medium containing a program for causing a computer to execute a control method of an image capture apparatus using an imaging element including a plurality of pixels configured to have a plurality of photoelectric conversion units for one micro lens, the control method comprising:
a first setting step of setting ones of the plurality of pixels in the imaging element as a first region and setting other ones of the plurality of pixels as a second region;
a second setting step of setting a distance measurement region for at least ones of the plurality of pixels; and
a readout step of performing a first readout operation of reading, from a first pixel included in the first region and the distance measurement region of the imaging element, signals according to electric charges accumulated in the photoelectric conversion units of the first pixel, and performing a second readout operation of reading, from a second pixel included in the second region and the distance measurement region, signals according to electric charges accumulated in the photoelectric conversion units of the second pixel, the second readout operation being different from the first readout operation, and
wherein the imaging element captures images in a plurality of frames, and when the same distance measurement region is set in the images in the plurality of frames at the second setting step, the position of the first region in the distance measurement region is changed between the images in the plurality of frames at random or periodically at the first setting step.

* * * * *